Oct. 6, 1931. E. W. DAVIS 1,825,941

COUPLING

Filed March 18, 1926   2 Sheets-Sheet 1

Inventor
Ernest W. Davis
By Pierce and Sweet
Attys.

Patented Oct. 6, 1931

1,825,941

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

COUPLING

Application filed March 18, 1926. Serial No. 95,688.

My invention relates to lubrication and more specifically to an improved coupling for connecting the discharge tube, or opening, of a source of lubricant under pressure, to means fixed on the bearing, or machine element, to be lubricated, for receiving such lubricant under pressure.

Among the objects and advantages of the invention may be enumerated:

First, the simplification and standardization of the constructional embodiment of the coupling;

Second, increased ease in replacement and maintenance; and

Third, greater certainty in operation.

The problem involved is unique on account of the small volumes to be handled, the relatively wide range and high upper limit of the pressures to be carried, and the unusually objectionable features, from a service standpoint, of even a very slight leakage. Thus, a relatively small quantity of lubricant is all that need be injected at each lubrication into an ordinary bearing, and a moderate pressure is often sufficient, but the equipment employed is usually capable of generating relatively high pressures of the order of magnitude of one thousand pounds per square inch or more, for forcing the lubricant positively into places clogged with dirt or old lubricant, and such high pressures are required at frequent intervals in service. Furthermore, a very slight leak soon soils the parts and destroys one of the main advantages rendering lubricating system of the type involved superior to ordinary grease cups, viz cleanliness.

Figure 1:
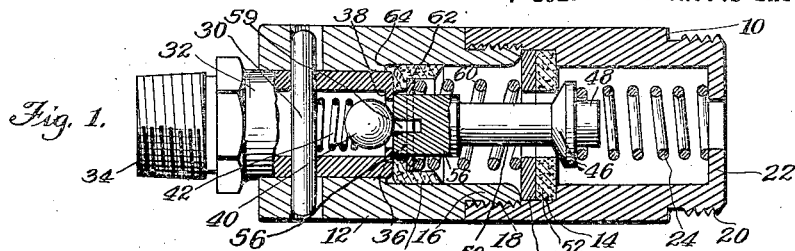
Figure 1 is a central section through a complete connection according to the invention, in position to deliver lubricant under pressure.

In all the embodiments shown, the female coupling member comprises two sleeves, a rear, or inlet, sleeve 10 and a front, or discharge, sleeve 12. The two sleeves are of smooth, uniform outer configuration and identical diameter, so that they appear in use as a single element. On the inside, one of the sleeves is enlarged as at 14 to form a shoulder, and the threaded end 16 on the other sleeve engages the threads 18 in the first sleeve to fasten the parts together. The channel thus formed between the end portion 16 and the opposing shoulder receives and clamps in place a suitable seat for the valve.

The rear sleeve is threaded at 20 for attachment to the discharge opening of a grease gun, or the end of a suitable conduit for conveying lubricant under pressure into the coupling. Its rear end is also provided with an inwardly extending flange 22 forming a seat for the valve spring 24.

The front sleeve is provided with a pair of bayonet slots 26 for receiving the projecting ends 28 of a pin 30 passing transversely through the tubular body 32 of a male coupling member, commonly referred to by the trade as a fitting. The fitting has a threaded tubular end portion 34 for attaching the same to a bearing, or the like, a smooth contact face 36 at its receiving end for forming a lubricant seal, and a shoulder at 38 forming a valve seat. The ball check valve 40 is held against the seat 38 by a suitable spring 42.

The slots 26 have been illustrated in this instance with a return pocket, or reversely inclined inner end portion 44, tending to retain the parts in coupled position.

In the embodiment of the invention selected for illustration in Figure 1, the valve comprises a valve member proper 46, carrying a stud 48 for centering the spring 24, and having a rigid stem 50. The valve proper 46 seats on an annular ring 52 of leather, fibre, or other material suitable for forming a tight seal, re-inforced by a metal ring 54, both clamped in place by assembling the front and rear sleeves. The valve stem terminates in an enlarged head 56 long enough to have direct engagement with the face of the fitting when the parts are coupled together, and thereby hold the valve 46 off its seat against the pressure of the spring 24 and the hydraulic pressure, if any, of the lubricant behind the valve.

The sealing means illustrated in Figure 1 comprises a cup-leather 58 having a central bore slightly larger than the seat for the valve 40 to leave room for the head 56 to make contact with the face of the fitting. The sealing gasket 58 is kept in close fitting sealing contact with the face 36 of the fitting by the tension of a compression spring 60 transmitted to the face of the gasket by a washer 62, and, when lubricant under pressure is passing through the assembled coupling, by the pressure of the lubricant itself acting not only against the face of the gasket, but against the cylindrical portion, which is thereby expanded tightly against the bore of the outer sleeve. A transverse slot 59 establishes communication between the inside of the discharge sleeve and the bore of the fitting.

When the fitting is removed from the position shown in Figure 1, the valve 46 will move down onto its seat, and simultaneously with such seating or slightly thereafter, the sealing gasket will be arrested by engagement with an inwardly facing shoulder 64 on which it rests when the parts are uncoupled.

It will be apparent that the assembled female coupling member is a self-contained unitary structure of convenient and serviceable shape, but that disconnecting the front and rear sleeves by unscrewing them, will let the metal ring 54, the valve seat 52, the valve and its stem 50, the springs 24 and 60, the sealing gasket 58 and the washer 62, all fall apart into as many separate pieces. Thus, any or all of the parts, which may have been worn by usage, or damaged by the insertion into the coupling member of tools not intended for such use, may readily be replaced, or repaired, and all the "insides" stacked together again and reassembled again by threading the sleeves together.

Figure 2:
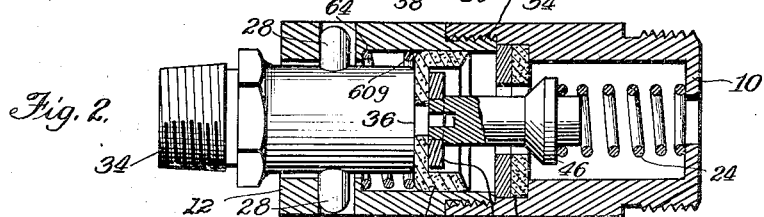
Figure 2 is a similar section of a modified construction, in which the thrust for opening the valve is transmitted through the face of the sealing gasket.

In the embodiment illustrated in Figure 2, the valve stem carries a washer 56$g$ instead of the head 56, for a contact abutment with the face of the gasket. The gasket is maintained in contact with the washer by a compression spring 60$g$ seated at one end against the shoulder 64, and bearing at its other end against the rolled edge of the gasket. The spring 60$g$ presses the gasket lightly against the washer, in opposition to superior force of the spring 24, which latter spring will maintain the valve seated in the absence of a fitting forcing it open.

Figure 3:
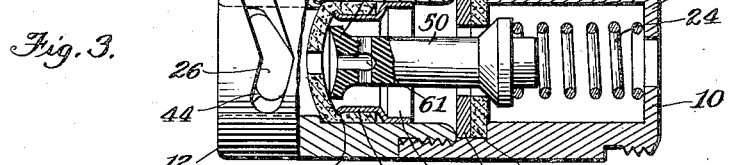
Figure 3 is a similar section of the female joint member only, illustrating a modification employing a single spring.

In the embodiment illustrated in Figure 3, the valve stem 50 terminates in a mushroom head 56$a$ having a concave end face, the edge of which abuts the sealing gasket. A slight frictional resistance against axial sliding movement of the gasket is preferably provided by a friction ring 66 having a shank 68 terminating in an outwardly flared lip 70 biting into the gasket to hold the parts together. The valve stem is made long enough so that the engagement of the face of the gasket with the shoulder 64 and with the edge of the head 56$a$ will flex the face of the gasket into the outwardly convex, or bulged, shape indicated by the drawings.

When a fitting is inserted, a contact will be made first with the central portion of the gasket, then an annular central area will be flexed flat against the face 36, then an effective thrust will be delivered to the valve stem 50 to open the valve, and simultaneously with the opening of the valve, the rest of the gasket face will be flexed flat against the end of the fitting.

Figure 4:
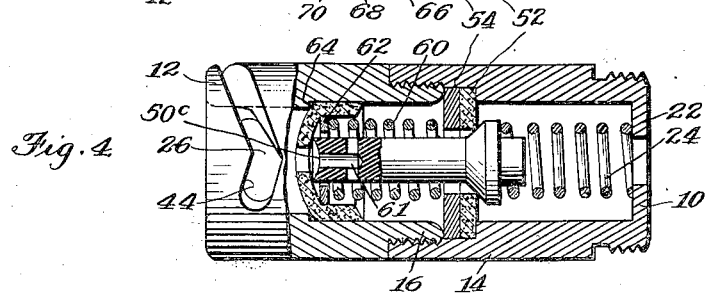
Figure 4 is a similar section illustrating spring means for holding the sealing gasket in outermost position, combined with a valve stem long enough to bulge the face of the gasket.

In the embodiment illustrated in Figure 4, the end of the valve stem is not enlarged into a head but merely provided with a concave end 50$c$. The gasket is held against the shoulder 64 by the compression spring 60 bearing on the washer 62. In this embodiment, the annular, central area first to flex is smaller than in Figure 3, and the final sealing contact is assisted by the force of the spring 60.

To leave a smooth peripheral edge on the heads of Figures 3 and 4, I employ a passageway 61 formed by transverse bores, instead of a slot.

Figures 5, 6:
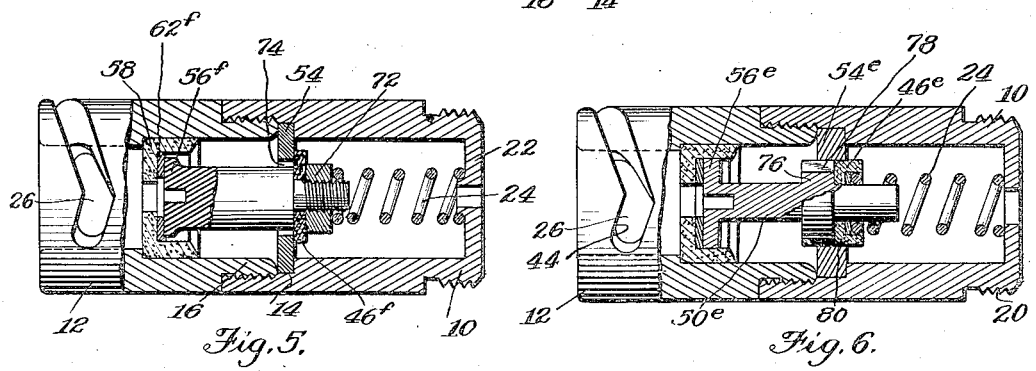
Figure 5 is a similar section showing a valve that will maintain its seal over an appreciable range of axial movement.
Figure 6 is a similar section in which the valve and gasket are fastened together, and another type of valve element permitting axial movement while maintaining the seal, is employed.

In the embodiment illustrated in Figure 5, the valve 46$f$ seats directly on the metal washer 54, and is, itself, of leather or the like, capable of flexing appreciably outside the clamped portion. The clamping ring 72 is of slightly greater diameter than the valve stem 50 so that its outer edge laps over nearly half of the radial clearance at 74. The washer 62f is a snug fit in the sealing gasket 58 and has contact abutment with the short head 56f. When the valve is lifted, the outer edge of it will flex downwardly a little and maintain sealing contact with the washer 54 during an appreciable axial movement sufficient to load the sealing gasket 58 and establish a tight seal before lubricant is permitted to flow. In the closed position shown, the edges of the valve are materially stiffer because of the greater diameter of the clamping ring 72.

In the embodiment illustrated in Figure 6, the head 56e is larger than the head 56f and grips the sealing gasket to carry it with the valve stem. The washer 54e cooperates with a specially shaped valve 46e comprising a cup-leather gasket transmitting the thrust of the spring 24 to the valve stem 50e by its abutment with an enlargement 76. The outer periphery of this enlargement slides smoothly in the bore of the washer 54e and has a plurality of slots 78 for permitting the passage of lubricant after the valve member 46e has been lifted clear. As in Figure 5, a considerable axial movement of the valve stem 50e will take place while a seal is still maintained by a slight flexure of the valve member 46e at the angle 80.

Figure 7:
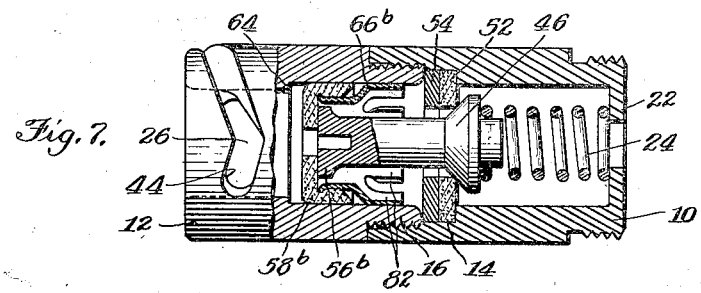
Figure 7 is a similar section illustrating the use of friction fingers for keeping the gasket in contact with the valve stem.

In the embodiment illustrated in Figure 7, the valve member is substantially identical with those in Figures 1 to 4, inclusive. The sealing gasket 58b has its face in direct abutment with the head 56b and a slight resistance to axial displacement is provided by the friction ring 66b carried by the sealing gasket and having a plurality of spring fingers 82 for good frictional engagement with the bore of the front sleeve. When the fitting is withdrawn from such a coupling member, the friction is sufficient to hold the sealing gasket in gentle contact with the valve stem head, but to replace a worn gasket it is only necessary to take the sleeves apart and slip in a new one.

Figure 8:
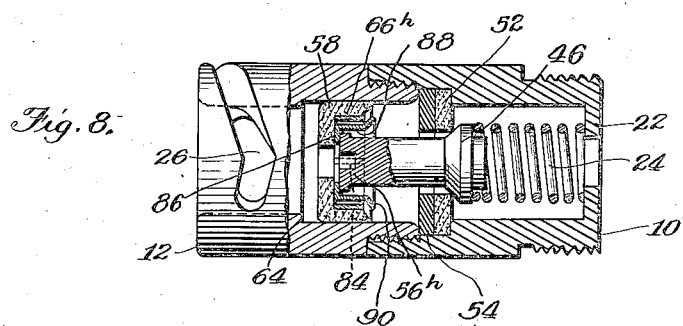
Figure 8 is a similar section illustrating the development of the necessary friction by expanding the cylindrical portion of the sealing gasket.

In the embodiment illustrated in Figure 8, the sealing gasket has its cylindrical portion resiliently expanded by a split ring 66h split at 84 and sprung into place inside the gasket. To assure the parts remaining nicely in place, the head 56h abuts the inner lip 86 of a cup 88 having a flaring rim 90. The lip 86 provides a satisfactory surface for receiving a thrust through the face of the gasket, and the flaring rim 90 will engage the edge of the split ring to keep it from working up axially out of the sealing gasket.

In Figure 7 and in Figure 8, the valve reaches a closed position with clearance left between the sealing gasket and the shoulder 64. In other words, the shoulder is merely to prevent accidental dislodgement of the sealing gasket, and performs no function during normal opening and closing of the valve.

Figure 9:
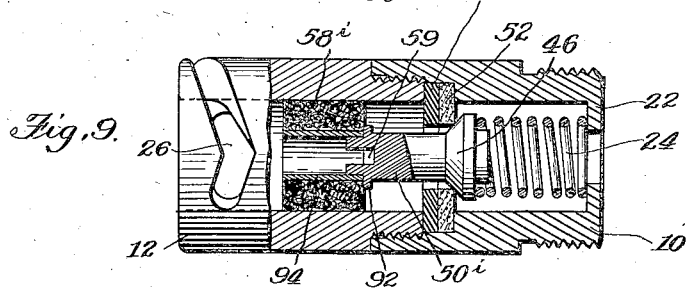
Figure 9 illustrates a cork sealing element held in place in the coupling bore by friction only.

In the embodiment illustrated in Figure 9, the valve stem 50i is provided with an annular shoulder 92. A cork friction cylinder 58i is jammed snugly into the bore of the front sleeve, having a snug friction fit therein. The re-inforcing sleeve 94 fits loosely on the end of the valve stem. I have found that a cork member of this sort will maintain snug frictional engagement and stay in place quite nicely without any shoulder 64. When, after a very long period of service, it happens to work loose, it can be withdrawn and a new tight-fitting one slipped in place without separating the sleeves.

Figure 10:
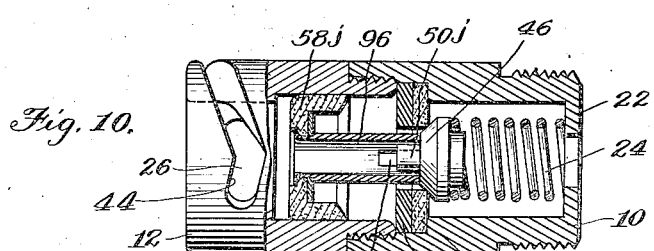
Figure 10 is a similar section illustrating a stem carried by the gasket for lifting the valve.

In the embodiment illustrated in Figure 10, the valve member 46 is provided only with a stub stem 50j, and the sealing gasket 58j carries a permanently assembled sleeve 96 slotted at 98 to provide a through passage for the lubricant. The end of the sleeve 96 has contact abutment with the base of the valve member 46 to push it open.

Figure 11:
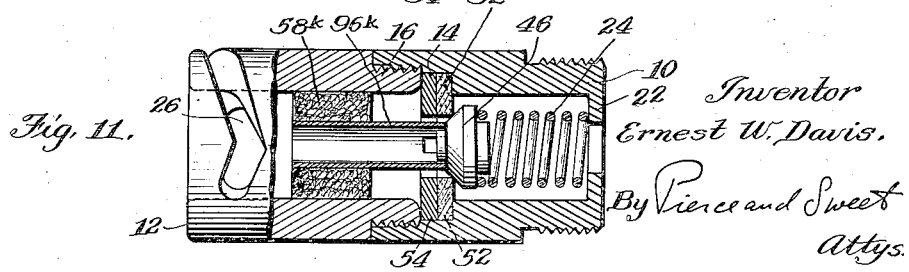
Figure 11 is a similar section employing a cork sealing member and a stem carried thereby.

In the embodiment illustrated in Figure 11, the sleeve 96k is provided with a tight fitting cork cylinder 58k similar to cylinder 58i of Figure 9, and replaceable in the same way.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. A lubricant coupling comprising inlet and outlet sleeves, a valve seat clamped between the juxtaposed ends of said sleeves, a lubricant receiving fitting, a bayonet joint connection between said outlet sleeve and said fitting, an inwardly opening check valve on said seat, and a spring in said inlet sleeve for holding said check valve closed.

2. A lubricant coupling member comprising a sleeve having an inlet and an outlet end, a check valve intermediate said ends, a seat for said valve, a spring housed in said inlet end for pressing said valve towards its seat, a stem on said valve extending toward said outlet, a cup-shaped sealing gasket having a bottom portion and a cylindrical portion and overlying the end of said stem, said stem and gasket having registering passageways for the exit of lubricant, bayonet joint means for telescoping said sleeve over a receiving fitting to push on said gasket and open said valve, a shoulder in said sleeve limiting outward movement of said gasket, said stem being long enough to push said gasket when said valve is closed, and a reinforcing ring inside the cylindrical portion, said ring extending axially beyond said gasket, the extending portion of said ring flaring out into contact with said sleeve.

3. A lubricant coupling member comprising a sleeve having an inlet end and an outlet end, a check valve intermediate said ends, a seat for said valve, a spring pressing said valve towards its seat, a stem on said valve extending toward said outlet, a gasket overlying the end of said stem, said stem and gasket having registering passage-ways for the exit of lubricant, means for telescoping said sleeve over a receiving fitting to push on said gasket and open said valve, said gasket bottom having removable contact with the end of said stem, and a metal ring permanently assembled with said gasket, said ring having friction fingers engaging said sleeve.

In witness whereof, I hereunto subscribe my name this 5th day of March, 1926.

ERNEST W. DAVIS.